United States Patent [19]
Courtney

[11] 4,189,168
[45] Feb. 19, 1980

[54] WHEEL SUSPENSION SYSTEM FOR A VEHICLE

[76] Inventor: Orley R. Courtney, 502 E. Wiley St., Marion, Ind. 46952

[21] Appl. No.: 900,790

[22] Filed: Apr. 28, 1978

[51] Int. Cl.² .......................................... B62K 25/26
[52] U.S. Cl. .................................................. 280/284
[58] Field of Search ............ 280/690, 696, 701, 285, 280/284, 286

[56] References Cited

U.S. PATENT DOCUMENTS

| | | | |
|---|---|---|---|
| 1,298,958 | 4/1919 | Johnston | 280/284 |
| 2,078,213 | 4/1937 | Martin | 280/284 |
| 3,974,892 | 8/1976 | Bolger | 280/284 X |
| 3,982,770 | 9/1976 | Satoh et al. | 280/284 |

Primary Examiner—Joseph F. Peters, Jr.
Assistant Examiner—Michael Mar
Attorney, Agent, or Firm—Lundy and Associates

[57] ABSTRACT

A wheel suspension system for two-wheeled vehicles such as motorcycles, bicycles, and the like, having a vehicle frame, a wheel assembly and a spring and shock absorber assembly. The wheel assembly includes an axle with a wheel rotatably disposed thereon. Paired wheel plates are rotatably attached to the opposite ends of the axle. A first pair of upwardly extending wheel supports have one end thereof secured to the wheel plates and the other end thereof attached to one end of the shock absorber assembly. The other end of the shock absorber assembly is attached to the vehicle frame. A second pair of wheel supports, extending transversely of the first supports, have one end thereof secured to the wheel plates and the other end thereof attached to the vehicle frame.

16 Claims, 4 Drawing Figures

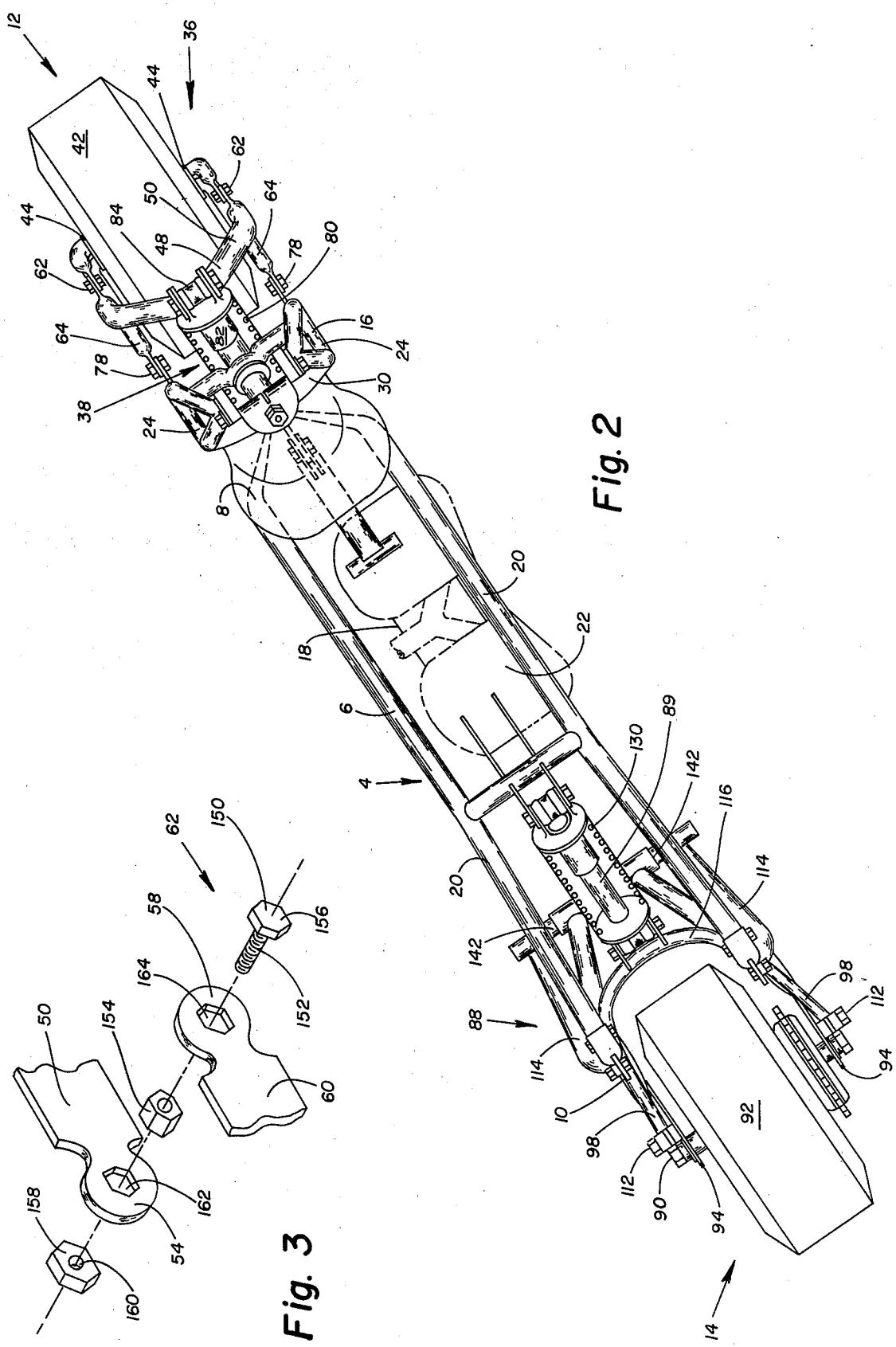

WHEEL SUSPENSION SYSTEM FOR A VEHICLE

BACKGROUND OF THE INVENTION

1. Field of the Invention

The field of the invention is that of wheel suspension systems for vehicles. More particularly, a wheel suspension system for two-wheeled vehicles such as motorcycles, bicycles and the like.

2. Description of the Prior Art

Wheel suspension systems for two-wheeled vehicles such as motorcycles, bicycles and the like generally have been manufactured as an integral part of the vehicle frame or fork assembly. Some such vehicles are heavy, and it often becomes difficult to repair the wheel suspension systems of such vehicles. Traditionally, such vehicles are inverted for such repairs, but for many such vehicles this is cumbersome and not possible with the tools at hand.

Thus, it would be highly desirable to provide an improved wheel suspension system for such vehicles which provides easy access to the wheel suspension system for repairs; and yet would be durable and relatively inexpensive to manufacture.

SUMMARY OF THE INVENTION

It is an object of the invention to provide an improved wheel suspension system for two-wheeled vehicles.

It is another object of the invention to provide an improved wheel suspension system for two-wheeled vehicles that is easily detachable from the main vehicle frame.

It is another object of the invention to provide an improved wheel suspension system for two-wheeled vehicles that allows for relatively easy repair and yet is durable, relatively uncomplicated in design and relatively inexpensive to manufacture.

Further, it is another object of the invention to provide an improved wheel suspension system for two-wheeled vehicles that allows the entire wheel to be partially disconnected from the main vehicle frame and moved into a repair position when the vehicle is supported on a jack or like device.

Broadly, the invention is a wheel suspension system for two-wheeled vehicles having a vehicle frame, a wheel assembly, and a spring and shock absorber assembly. The wheel assembly is detachably connected to both the shock absorber assembly and the vehicle frame, and the shock absorber assembly is detachable from the vehicle frame. The wheel assembly includes an axle with a wheel rotatably disposed thereon. Paired wheel plates are attached to the opposite ends of the axle. A first pair of upwardly extending wheel supports connect the paired plates and the shock absorber assembly, and a second pair of wheel supports, extending transversely of the first supports, connect the paired plates to the vehicle frame.

BRIEF DESCRIPTION OF THE DRAWINGS

The above mentioned and other features and objects of this invention and the manner of attaining them will become more apparent and the invention itself will be best understood by reference to the following description of the invention taken in conjunction with the accompanying drawings wherein:

FIG. 2 is a top view of the wheel suspension system of the invention;

FIG. 3 is a fragmentary and exploded view illustrating the details of the connection between the wheel supports and the connectors of the invention.

DESCRIPTION OF A SPECIFIC EMBODIMENT

Figure 1:
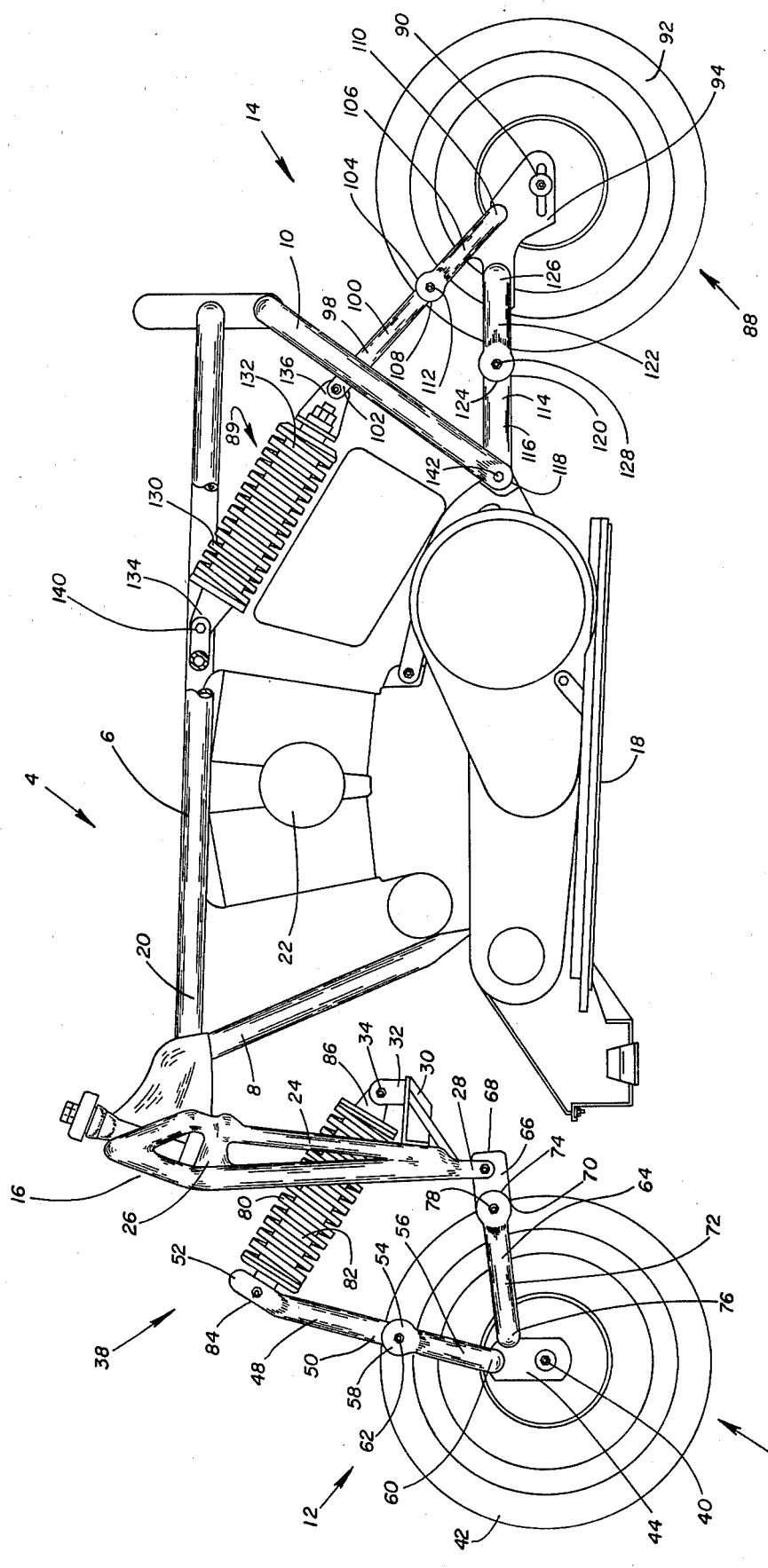
FIG. 1 is a side view of the wheel suspension system of the invention.

Referring now to FIGS. 1 and 2, the invention comprises a vehicle 4 having a vehicle frame 6 with forward and rearward ends 8 and 10, respectively. Forward and rearward wheel suspension systems 12 and 14; respectively, are connected to vehicle frame 6 at the forward and rearward ends 8 and 10, thereof, respectively. The vehicle frame 6 is of a generally conventional structure and includes a steering fork assembly 16, a jack plate 18, an upper horizontal support member 20 and a motor assembly 22. A pair of steering fork arms 24 have opposite upper and lower ends 26 and 28 respectively. The lower ends 28 thereof extend downward and are connected by a bracket 30. A vertical ear 32 with an aperture 34 therein is attached to the bracket 30 rearwardly thereof.

The front wheel suspension system 12 is comprised of a front wheel assembly 36 and a front spring and shock absorber assembly 38. The front wheel assembly is comprised of a front axle 40 having a front wheel 42 rotatably disposed thereon. Paired axle plates 44 are attached to the opposite ends 46 and 46' of front axle 40. A first pair of front wheel supports 48 are generally upstanding and include a forked member 50 having opposite single and forked ends 52 and 54 respectively, and paired members 56 having opposite ends 58 and 60. Paired members 56 being detachably connected at ends 58 thereof to the forked ends 54 of forked member 50 by means of paired connectors 62. A second pair of front wheel supports 64 extend transversely of first pair of front wheel supports 48 and include a forked member 66 having opposite single and forked ends 68 and 70 respectively, and paired members 72 having opposite ends 74 and 76. Forked member 66 is detachably connected at forked ends 70 thereof to ends 74 of paired members 72 by means of paired connectors 78. These connections are such that forked members 50, 66 and paired members 56, 74 are immovably and rigidly held respectively in an end-to-end relationship, when connected, and yet can be disconnected when desired as described hereinafter.

The front spring and shock assembly 38 includes a spring 80 compressibly confined around a front shock absorber 82 which has opposite forward and rearward ends 84 and 86, respectively. The single end 52 of forked member 50 is secured to forward end 84 of shock absorber 82. Ends 60 of paired members 56 are secured to paired front axle plates 44. The single end of 68 of forked member 66 is pivotally connected to the distal ends 28 of paired steering fork arms 24. Ends 76 of paired members 72 are secured to axle plates 44. Rearward end 86 of shock absorber 82 is pivotally connected to bracket 30 by means of aperture 34 located within vertical ear 32 thereof.

The rearward wheel suspension system 14 is comprised of a rear wheel assembly 88 and a rear spring and shock assembly 89. The rear wheel assembly 88 is comprised of a rear axle 90 having a rear wheel 92 rotatably disposed thereon. Paired axle plates 94 are attached to the opposite ends 96 and 96' of rear axle 90. A first pair of rear wheel supports 98 are generally upstanding and include a forked member 100 having opposite single 102 and forked ends 104 respectively and paired members 106 having opposite ends 108 and 110. The forked ends 104 of forked member 100 are attached to the ends 108 of paired members 106 by means of paired connectors 112 so as to immovably and rigidly hold forked member 100 and paired members 106 in an end-to-end relationship. A second pair of rear wheel supports 114 extend transversely of the first pair of rear wheel supports 98 and include a forked member 116 having opposite single and forked ends 118 and 120, respectively, and paired member 122 having opposite ends 124 and 126. The forked ends 120 of forked member 116 are attached to the ends 124 of paired members 122 by means of paired connectors 128 so as to immovably and rigidly hold forked member 116 and paired members 122 in an end-to-end relationship.

The rear spring and shock absorber assembly 89 includes a spring 130 compressibly confined around a rear shock absorber 132 having opposite forward and rearward ends 134 and 136, respectively. The forward end 134 of shock absorber 132 is connected to vehicle frame 6 at point 140. The rearward end 136 of shock absorber 132 is pivotally connected to the single end 102 of forked member 100. Ends 110 of paired members 106 are secured to paired rear axle plates 94. The single end 118 of forked member 116 is pivotally connected to vehicle frame 6 at point 142. Ends 126 of paired members 122 are secured to paired rear axle plates 94.

Referring to FIGS. 3, the detail of the connections between the various members 50, 56, 66, 72, 100, 106 and 122 as maintained by paired connectors 62, 78, 112, and 128, is shown in detail. Each connection in a specific embodiment, is identical; and thus, only the connection is between forked end 54 of forked member 50 and end 58 of paired members 56 is shown. Connector 62 includes a bolt 150 having a threaded portion 152, a hexagonal collar 154 and a hexagonal head 156, and a nut 158 having a threaded aperture 160 located therein. Further, the corresponding ends 54 and end 58 each have hexagonally shaped apertures 162 and 164 therein, respectively. In order to rigidly secure fork end 54 and end 58 together, bolt 150 is passed through apertures 162 and 164 and is threadedly attached to nut 58 so that hexagonal collar 154 is contained within apertures 162 and 164. The corresponding shape of collar 154 and apertures 162 and 164 prevents any relative movement between ends 54, 58.

It can now be seen that both the forward and rearward wheel suspension systems 12 and 14, respectively, are rotatably and resiliently mounted relative to vehicle frame 6. Thus, road shocks and the vehicle load, which includes passengers located on the vehicle 4, will be cushioned and dampened by wheel suspension systems 12 and 14.

It can also now be seen that the wheel suspension system of the invention allows for either the complete removal or partial removal of either the front wheel assembly 36 or rear wheel assembly 88 from the vehicle frame. The design thereof being particularly suited for the easy removal of wheels 42, 92 in an emergency situation and without the aid of elaborate repair devices.

Figure 4:
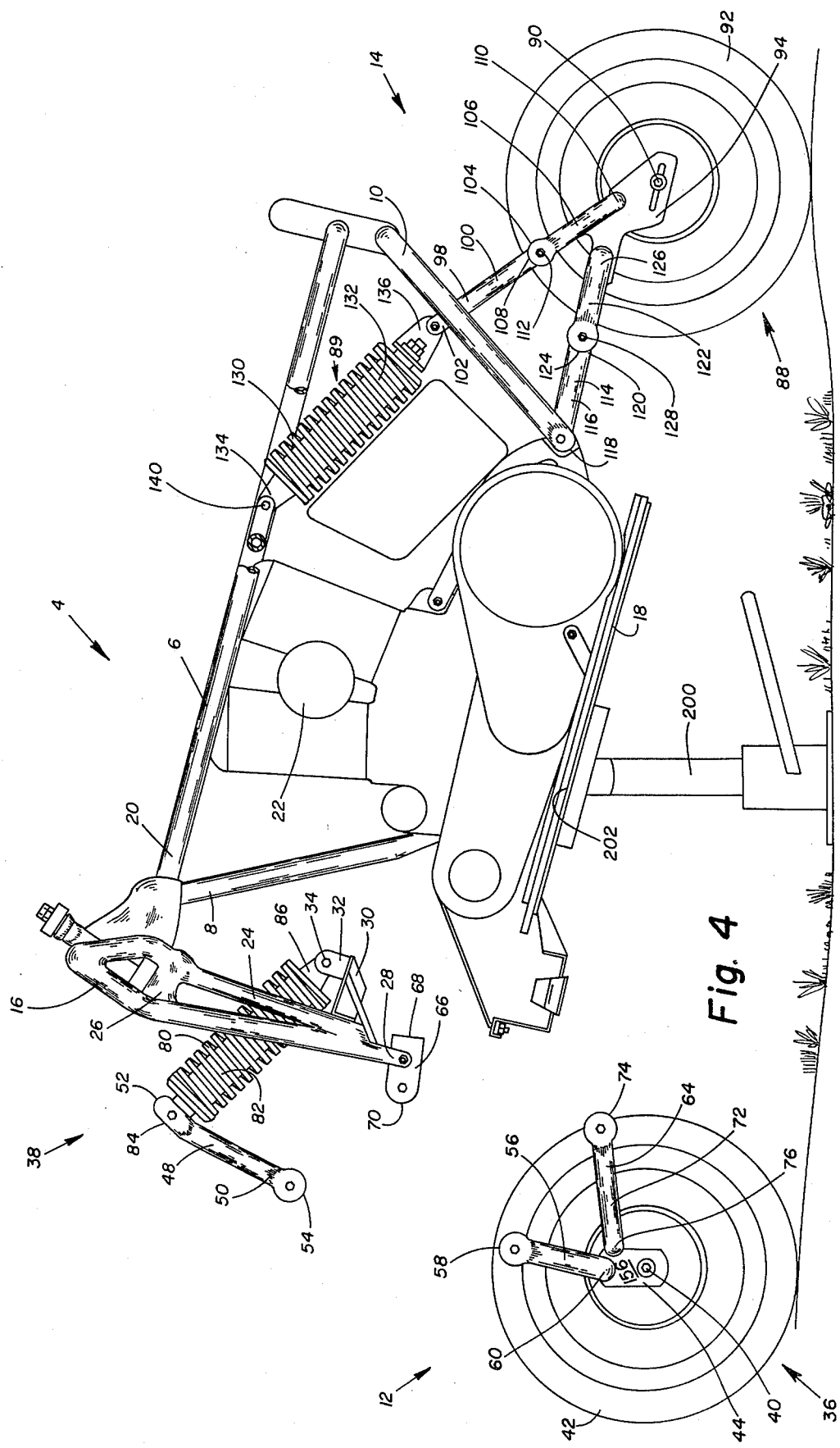
FIG. 4 is a side view of the wheel suspension system of the invention illustrating the repair thereof.

Referring to FIG. 4, the repair of front wheel 42 and the rear wheel 92 will be described. Since the procedure is the same, reference will be made to the front wheel 42 with the understanding that the same applies for rear wheel 92. A hydraulic jack 200, or the like, is placed underneath the vehicle jack plate 18 at a structurally sound position. In the alternative, the vehicle may be placed upon its side or otherwise positioned so that the front wheel 42 is free to rotate. In this position, front wheel 42 may be partially removed by removing either paired connectors 62 or 78, and partially removing the other connector. Partial removal of the connector requires that only collar 154 of bolt 150 be removed from apertures 162 and 164. This will allow front wheel 42 to pivot about the partially removed connector into a repair position. In order to completely remove front wheel 42, the remaining connector is completely removed.

Thus, it can be seen that the invention provides an improved wheel suspension system for vehicles. The improved wheel suspension system of the invention allows for relatively easy repair and yet is durable, relatively uncomplicated in design, and relatively inexpensive to manufacture. The invention allows the entire wheel to be partially disconnected from the main vehicle frame and moved into a repair position when the vehicle is supported on a jack or like device or completely removed and disconnected from the frame, if desired.

While there have been described above the principles of this invention in connection with specific apparatus, it is to be clearly understood that this description is made only by way of example and not as a limitation to the scope of the invention.

What is claimed is:

1. A wheel suspension system for vehicles having a vehicle frame comprising a wheel assembly, and a spring and shock absorber assembly, said wheel assembly including a wheel with an axle rotatably disposed thereon, paired axle plates being rotatably attached to the opposite ends of said axle, a first pair of upstanding wheel supports having opposite ends, a second pair of wheel supports extending transversely of said first pair and having opposite ends, each of said wheel supports including at least two portions and means for detachably connecting said portions together and rigidly holding said portions in an end-to-end relation without any relative movement therebetween when connected, said portions having ends remote from said means defining said opposite ends of said wheel supports, said spring and shock absorber assembly including a shock absorber having opposite ends, one end of said upstanding wheel supports being secured to said paired plates and the other end of said upstanding wheel supports being connected to one end of said shock absorber, the other end of said shock absorber being connected to said vehicle frame; one end of said transversely extending wheel supports being secured to said paired plates and the other end of said transversely extending wheel supports being pivotally attached to said vehicle.

2. The wheel suspension system of claim 1 wherein said upstanding wheel support portions include an upstanding connector having opposite forked and single ends and paired upstanding wheel struts having opposite ends; said single end being connected to said one end of said shock absorber, said forked ends being connected respectively to one of said ends of said paired upstanding wheel struts, and the other of said ends of said paired upstanding wheel struts being secured respectively to said axle plates.

3. The wheel suspension system of claim 1 wherein said transverse wheel support portions include a transverse connector having opposite forked and single ends and paired transverse wheel struts having opposite ends, said forked ends being connected respectively to one of said ends of said paired transverse wheel struts and said single end being attached to said vehicle frame, the other of said ends of said paired and transverse wheel struts being respectively secured to said axle plates.

4. The wheel suspension system of claim 1 wherein said connecting means includes a connector and cooperating portions of said wheel support portions.

5. The wheel suspension system of claim 1 wherein said conncecting means includes flattened portions of said wheel support portions adjacent to one end thereof, an aperture in each of said flattened portions, said apertures having corners, and a connector position in each of said apertures, said connectors having a portion thereof in said apertures which is complementary in shape to said apertures.

6. The wheel suspension system of claim 5 wherein said connector portions and said apertures are both hexagonal in shape.

7. A wheel suspension system for vehicles particularly suitable for two-wheeled vehicles such as bicycles and the like having a vehicle frame and a front wheel steering fork pivotally connected to said frame comprising a front wheel assembly, a front shock absorber assembly, a front axle having said front wheel assembly rotatably disposed thereon, paired front axle plates being rotatably attached to the opposite ends of said axle, a first pair of front wheel supports having opposite ends, a second pair of front wheel supports having opposite ends, said front shock absorber assembly including a front shock absorber and a front spring compressibly held between the opposite ends thereof, the pivotal axis of said fork being aligned to project rearwardly of said front axle, said fork depending downwardly and rearwardly of said front axle, said front shock absorber having one end pivotally connected to said fork and the other end projecting forwardly thereof, one end of said first pair of front wheel supports being respectively secured to said paired front plates and the other end of said first pair of front wheel supports being attached to the other end of said front shock absorber, one end of said second pair of said front wheel supports being respectively secured to said paired front plates and the other end of said second pair of front wheel supports being pivotally attached to said fork, said second paired wheel supports include a transverse connector having opposite forked and single ends and paired transverse wheel struts having opposite ends, said forked ends being connected respectively to one of said ends of said paired transverse wheel struts, said single end being attached to said fork, the other of said ends of said paired transverse wheel struts being respectively secured to said axle plates.

8. The wheel suspension system of claim 7 wherein said first wheel supports include an upstanding connector having opposite forked and single ends and paired upstanding wheel struts having opposite ends, said single end being connected to said one end of said shock absorber, said forked ends being connected respectively to one end of said paired upstanding wheel struts, the other of said ends of said paired upstanding wheel struts being secured respectively to said axle plates.

9. The wheel suspension system of claim 8 further including means for detachably connecting and rigidly holding and preventing any relative movement between said upstanding connector and said paired upstanding wheel struts when connected.

10. The wheel suspension system of claim 7 further including means for detachably connecting and rigidly holding and preventing any relative movement between said transverse connector and said paired transverse wheel struts where connected.

11. A wheel suspension system for vehicles particularly suitable for two wheeled vehicles such as bicycles and the like having a vehicle frame comprising a rear wheel assembly, a rear shock absorber assembly, a rear axle having said rear wheel assembly rotatably disposed thereon, paired rear axle plates being rotatably attached to the opposite ends of said axle, a first pair of rear wheel supports having opposite ends, a second pair of rear wheel supports having opposite ends, said shock absorber assembly including a rear shock absorber and a spring compressibly held between the opposite ends thereof, said shock absorber having one end pivotally connected to said vehicle frame and the other end thereof projecting downwardly and rearwardly therefrom, one end of said first pair of wheel supports being respectively secured to said paired plates and the other end of said first pair of wheel suports being attached to said other end of said shock absorber, one end of said second pair of wheel supports being respectively secured to said paired plates and the other end of said second pair of wheel supports being pivotally attached to said vehicle frame, said second paired wheel supports include a transverse connector having opposite forked and single ends and paired transverse wheel struts having opposite ends, said forked ends being connected respectively to one of said ends of said paired transverse wheel struts, said single end being pivotally attached to said vehicle frame, the other of said ends of said paired transverse wheel struts being respectively secured to said axle plates.

12. The wheel suspension system of claim 11 wherein said first wheel supports include an upstanding connector having opposite forked and single ends and paired upstanding wheel struts having opposite ends, said single end being connected to said other end of said shock absorber, said forked ends being connected respectively to one end of said paired upstanding wheel struts, the other of said ends of said paired upstanding wheel struts being secured respectively to said axle plates.

13. The wheel suspension system of claim 12 further including means for detachably connecting and rigidly holding and preventing any relative movement between said upstanding connector and said paired upstanding wheel struts when connected.

14. The wheel suspension system of claim 11 further including means for detachably connecting and rigidly holding and preventing any relative movement between said transverse connector and said paired transverse wheel struts when connected.

15. The wheel suspension system of claim 11 wherein said first wheel support supports include an upstanding connector having opposite forked and single ends and paired upstanding wheel struts having opposite ends, said single end being connected to said other end of said shock absorber, said forked ends being connected respectively to one end of said paired upstanding wheel struts, the other of said ends of said paired upstanding wheel struts being secured respectively to said axle plates, a front wheel assembly and a front shock absorber assembly, a front axle having said front wheel assembly rotatably disposed thereon, paired front axle plates being rotatably attached to the opposite ends of said axle, a first pair of front wheel supports having opposite ends, a second pair of front wheel supports having opposite ends, said front shock absorber assembly including a front shock absorber and a front spring compressibly held between the opposite ends thereof, a fork pivotally connected to said frame, the pivotal axis of said fork being aligned to project rearwardly of said front axle, said forked member depending downwardly and rearwardly of said front axle, said front shock absorber having one end pivotally connected to said fork and the other end projecting forwardly thereof, one end of said first pair of front wheel supports being respectively secured to said paired front plates and the other end of said first pair of front wheel supports being attached to the other end of said front shock absorber, one end of said second pair of said front wheel supports being respectively secured to said paired front plates and the other end of said second pair of front wheel supports being pivotally attached to said fork.

16. The wheel suspension system of claim 15 further including means for detachably connecting and rigidly holding and preventing any relative movement between said upstanding connector and said paired upstanding wheel struts when connected, means for detachably connecting and rigidly holding and preventing any relative movement between said transverse connector and said paired transverse wheel struts when connected.

* * * * *

UNITED STATES PATENT OFFICE
CERTIFICATE OF CORRECTION

Patent No. 4,189,168  Dated February 19, 1980

Inventor(s) Orley Ray Courtney

It is certified that error appears in the above-identified patent and that said Letters Patent are hereby corrected as shown below:

Column 6, Line 10 between "struts" and "connected" change "where" to "when".

Signed and Sealed this

Twenty-fifth Day of November 1980

[SEAL]

Attest:

SIDNEY A. DIAMOND

Attesting Officer

Commissioner of Patents and Trademarks